United States Patent
Trita

(10) Patent No.: US 10,488,589 B2
(45) Date of Patent: Nov. 26, 2019

(54) T-SHAPED ARRAYED WAVEGUIDE GRATING

(71) Applicant: ROCKLEY PHOTONICS LIMITED, London (GB)

(72) Inventor: Andrea Trita, Pasadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/643,399

(22) Filed: Jul. 6, 2017

(65) Prior Publication Data

US 2018/0224603 A1    Aug. 9, 2018

Related U.S. Application Data

(60) Provisional application No. 62/456,613, filed on Feb. 8, 2017.

(51) Int. Cl.
*G02B 6/12*    (2006.01)

(52) U.S. Cl.
CPC ...... *G02B 6/12011* (2013.01); *G02B 6/12009* (2013.01); *G02B 6/12014* (2013.01); *G02B 6/12028* (2013.01); *G02B 6/12033* (2013.01)

(58) Field of Classification Search
CPC ............ G02B 6/12011; G02B 6/12009; G02B 6/12014; G02B 6/12028; G02B 6/12033
USPC ................................................ 385/14, 44–47
See application file for complete search history.

(56) References Cited

U.S. PATENT DOCUMENTS

| | | | | |
|---|---|---|---|---|
| 5,661,825 A | * | 8/1997 | Van Dam | G02B 6/12011 385/11 |
| 5,694,496 A | * | 12/1997 | Ando | C08G 73/1039 385/11 |
| 5,793,907 A | | 8/1998 | Jalali et al. | |
| 5,901,259 A | * | 5/1999 | Ando | C08G 73/1039 385/16 |
| 6,072,920 A | * | 6/2000 | Ando | C08G 73/1039 385/11 |
| 6,141,467 A | * | 10/2000 | Doerr | G02B 6/12021 385/24 |
| 6,212,323 B1 | | 4/2001 | Harpin et al. | |
| 7,049,004 B2 | | 5/2006 | Domash et al. | |

(Continued)

FOREIGN PATENT DOCUMENTS

| | | |
|---|---|---|
| CA | 2 275 800 A1 | 12/2000 |
| EP | 0 826 989 A2 | 3/1998 |

(Continued)

OTHER PUBLICATIONS

Very Compact Arrayed-Waveguide-Grating Demultiplexer Using Si Photonic Wire Waveguides, by Fuzikawa et al; Japanese Journal of Applied Physics (Year: 2004).*

(Continued)

*Primary Examiner* — Omar R Rojas
(74) *Attorney, Agent, or Firm* — Lewis Roca Rothgerber Christie LLP

(57) ABSTRACT

An arrayed waveguide grating. The arrayed waveguide grating includes two star couplers and an array of waveguides connecting the star couplers. The T-shaped geometry of the array of waveguides makes possible an AWG with an arbitrarily large free spectral range in a compact form factor.

20 Claims, 10 Drawing Sheets

(56) References Cited

U.S. PATENT DOCUMENTS

| | | | |
|---|---|---|---|
| 7,174,063 B2* | 2/2007 | Doerr | G02B 6/12011 385/14 |
| 7,382,953 B1* | 6/2008 | Bulthuis | G02B 6/12011 385/37 |
| 7,492,988 B1* | 2/2009 | Nordin | B82Y 20/00 257/10 |
| 9,366,819 B1 | 6/2016 | Bauters et al. | |
| 2002/0122651 A1 | 9/2002 | Roberts | |
| 2003/0072009 A1 | 4/2003 | Domash et al. | |
| 2003/0123799 A1 | 7/2003 | Lazaro Villa | |
| 2003/0161579 A1 | 8/2003 | Yan et al. | |
| 2004/0101239 A1 | 5/2004 | Parker | |
| 2007/0160326 A1 | 7/2007 | Kwakernaak et al. | |
| 2011/0142396 A1 | 6/2011 | Okamoto | |
| 2011/0164879 A1* | 7/2011 | Vasilyev | G02B 6/12014 398/81 |
| 2013/0243383 A1 | 9/2013 | Agarwal et al. | |
| 2013/0308904 A1* | 11/2013 | McGinnis | G02B 6/12014 385/37 |
| 2014/0376861 A1* | 12/2014 | Nakamura | G02B 6/12014 385/37 |
| 2017/0023736 A1* | 1/2017 | Bauters | G02B 6/12033 |
| 2017/0090122 A1 | 3/2017 | Kato | |

FOREIGN PATENT DOCUMENTS

| | | |
|---|---|---|
| EP | 1 191 363 A1 | 3/2002 |
| EP | 1 319 967 A1 | 6/2003 |
| EP | 1 698 922 A2 | 9/2006 |
| GB | 2 334 594 A | 8/1999 |
| JP | 7-104137 A | 4/1995 |
| WO | WO 2014/060648 A1 | 4/2014 |

OTHER PUBLICATIONS

Simultaneous Interrogation of Multiple Fiber Bragg Grating Sensors Using an Arrayed Waveguide Grating Filter Fabricated in SOI Platform by Trita et al; IEEE Photonics Journal (Year: 2015).*

Pathak. S et al., "Comparison of AWGs and Echelle Gratings for Wavelength Division Multiplexing on Silicon-on-Insulator", IEEE Photonics Journal, Oct. 2014, 10 pages, vol. 6, No. 5.

Madsen, Christi K., et al., "Chapter 4: Multi-Stage MA Architectures", Optical Filter Design and Analysis: A Signal Processing Approach, 1999, pp. 165-236, John Wiley & Sons, Inc.

International Search Report and Written Opinion of the International Searching Authority, dated Jul. 19, 2018, Corresponding to PCT/EP2018/053219, 19 pages.

U.K. Intellectual Property Office Combined Search and Examination Report, dated Aug. 8, 2018, for Patent Application No. GB1802072.7, 8 pages.

Cocorullo, G. et al., "Measurement of the thermo-optic coefficient of a-Si:H at the wavelength of 1500 nm from room temperature to 200 °C", Journal of Non-Crystalline Solids, 2002, pp. 310-313, Elsevier Science B.V.

Lycett, Richard J. et al., "Perfect Chirped Echelle Grating Wavelength Multiplexor: Design and Optimization", IEEE Photonics Journal, Apr. 2013, 24 pages, vol. 5, No. 2, IEEE Photonics Society.

Takei, Ryohei et al., "Sub-1 dB/cm submicrometer-scale amorphous silicon waveguide for backend on-chip optical interconnect", Optics Express, Feb. 24, 2014, pp. 4779-4788, vol. 22, No. 4, Optical Society of America.

Partial Search Report of the International Searching Authority, dated May 8, 2018, Corresponding to PCT/EP2018/053219, 11 pages.

International Search Report and Written Opinion of the International Searching Authority, dated Nov. 26, 2018, Corresponding to PCT/IB2018/000916, 12 pages.

U.S. Appl. No. 16/036,866, filed Jul. 16, 2018.

U.S. Appl. No. 16/088,387, filed Sep. 25, 2018.

Iodice, M. et al., "Thermo-optical static and dynamic analysis of a digital optical switch based on amorphous silicon waveguide", Optics Express, Jun. 12, 2006, pp. 5266-5278, vol. 14, No. 12, Optical Society of America.

Kamei, Shin, "Recent Progress on Athermal AWG Wavelength Multiplexer", 2009, 3 pages, Optical Society of America.

Pathak, Shibnath, "Silicon Nano-Photonics based Arrayed Waveguide Gratings", IMEC, Mar. 2014, pp. 1-75, Universiteit Gent.

U.S. Office Action dated Apr. 4, 2019, for U.S. Appl. No. 16/036,866, 9 pages.

* cited by examiner

T-SHAPED ARRAYED WAVEGUIDE GRATING

CROSS-REFERENCE TO RELATED APPLICATION(S)

The present application claims priority to and the benefit of U.S. Provisional Application No. 62/456,613, filed Feb. 8, 2017, entitled "T-SHAPED ARRAYED WAVEGUIDE GRATING", the entire content of which is incorporated herein by reference.

FIELD

One or more aspects of embodiments according to the present invention relate to arrayed waveguide gratings, and more particularly to an improved arrayed waveguide grating design.

BACKGROUND

Arrayed waveguide gratings (AWGs) may be used in various applications, to route light according to its wavelength. Rectangular AWGs may have various favorable characteristics, including compactness, but the number of channels and the channel spacing achievable with such devices may be limited by constraints on the transverse separation between waveguides of the array.

Thus, there is a need for an improved arrayed waveguide grating design.

SUMMARY

Aspects of embodiments of the present disclosure are directed toward an arrayed waveguide grating. The arrayed waveguide grating includes two star couplers and an array of waveguides connecting the star couplers. The T-shaped geometry of the array of waveguides makes possible to achieve an AWG with an arbitrarily large free spectral range in a compact form factor.

According to an embodiment of the present invention there is provided a arrayed waveguide grating, including: a first star coupler; a second star coupler; and an array of waveguides connecting the first star coupler and the second star coupler, each of the waveguides having four bends, each of the bends having a change of direction of at least 80 degrees, wherein a first waveguide of the array of waveguides has, along the first waveguide in a direction from the first star coupler to the second star coupler: a first clockwise bend; a first counterclockwise bend following the first clockwise bend; a second counterclockwise bend following the first counterclockwise bend; and a second clockwise bend following the second counterclockwise bend.

In one embodiment, all of the waveguides of the array of waveguides have the same length, and each of a subset of the waveguides includes a section with a respective adjustable effective index of refraction, the arrayed waveguide grating being tunable, by adjustment of the respective effective indices of refraction, to have, for any pair of the waveguides of the array of waveguides, an effective length difference of zero.

In one embodiment, each of the bends has a minimum radius of curvature of less than 200 microns.

In one embodiment, the arrayed waveguide grating has 18 channels and a minimum channel spacing of the arrayed waveguide grating is at least 80 GHz.

In one embodiment, the arrayed waveguide grating includes 12 waveguides including the first waveguide.

In one embodiment, each of the waveguides has six bends including the four bends, each of the bends having a change of direction of at least 80 degrees.

In one embodiment, each of the bends has a minimum radius of curvature of less than 200 microns.

In one embodiment, the arrayed waveguide grating has 18 channels at the second star coupler and a minimum channel spacing of the arrayed waveguide grating is at least 80 GHz.

In one embodiment, the array of waveguides includes 12 waveguides including the first waveguide the first waveguide.

In one embodiment, a second waveguide of the array of waveguides has, along the waveguide in a direction from the first star coupler to the second star coupler: a first clockwise bend; a second clockwise bend following the first clockwise bend; a first counterclockwise bend following the second clockwise bend; a second counterclockwise bend following the first counterclockwise bend; a third clockwise bend following the second counterclockwise bend; and a fourth clockwise bend following the third clockwise bend.

In one embodiment, the second waveguide further has, along the waveguide in a direction from the first star coupler to the second star coupler: a first curved section preceding the first clockwise bend, the first curved section having: a minimum radius of curvature less than 3 mm and greater than 1 mm, and a change of direction of less than 10 degrees.

In one embodiment, along the entire length of the second waveguide, the rate of change of curvature is less than $15/\text{mm}^2$.

In one embodiment, the second waveguide further has: a first straight section between the first clockwise bend and the second clockwise bend, the first straight section having a maximum curvature less than 0.01/mm; and a second straight section between the third clockwise bend and the fourth clockwise bend, the second straight section having a maximum curvature less than 0.01/mm.

In one embodiment, the second waveguide further has a first straight section between the first counterclockwise bend and the second counterclockwise bend, the first straight section having a maximum curvature less than 0.01/mm.

In one embodiment, the arrayed waveguide grating has an overall length and an overall width, the product of the overall length and an overall width being less than $40\ \text{mm}^2$.

In one embodiment, the arrayed waveguide grating has a minimum channel separation of at least 80 GHz.

In one embodiment, the arrayed waveguide grating has at least 18 channels.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a T-shaped arrayed waveguide grating provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
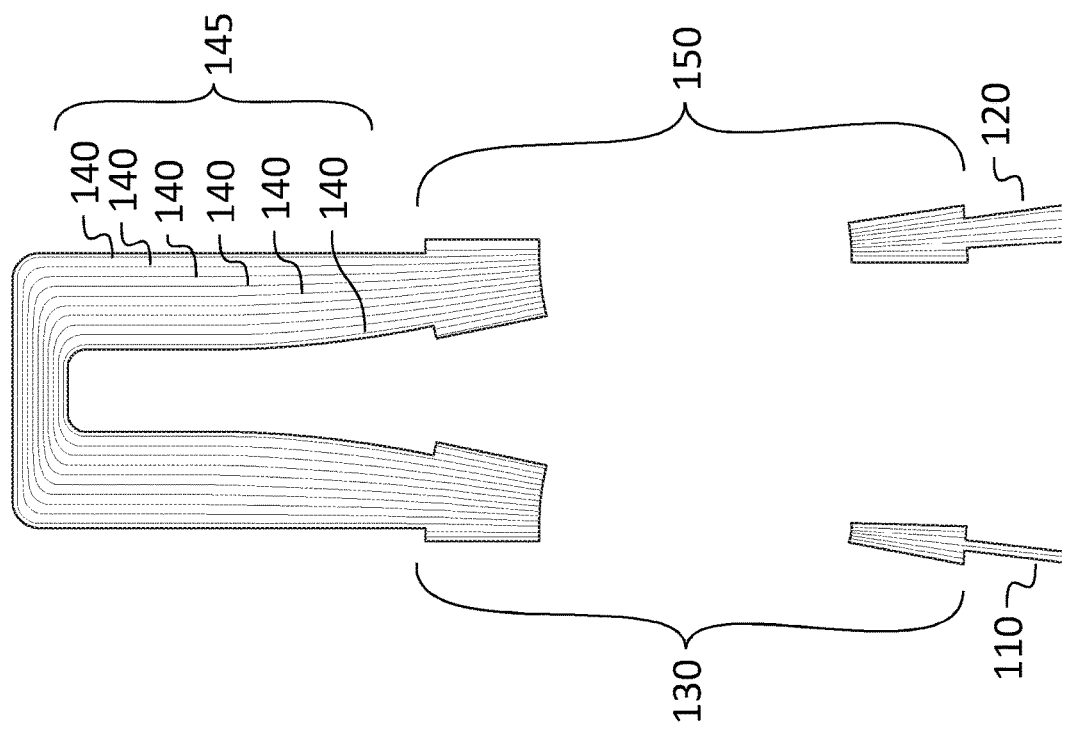
FIG. 1A is a plan view of a rectangular arrayed waveguide grating, according to an embodiment of the present invention.

Referring to FIG. 1A, in some embodiments a rectangular arrayed waveguide grating (AWG) may be used to direct light from an input waveguide 110 to one of a plurality of output waveguides 120 according to the wavelength of the light. Light from the input waveguide 110 illuminates, at a first star coupler 130, each waveguide 140 of an array 145 of waveguides 140, each of which has a different length. At a second star coupler 150, the light exiting the waveguides 140 may interfere constructively at one of the output waveguides 120.

The output waveguide at which the constructive interference occurs depends on the wavelength of the light; accordingly, a wavelength may be associated with each output waveguide 120. The wavelength (or frequency) difference between the wavelengths corresponding to two adjacent output waveguides is referred to herein as the "channel spacing". The AWG may be a reciprocal device, e.g., for light traveling in one direction through the AWG it may behave as a wavelength division multiplexing (WDM) multiplexer, and for light traveling in the opposite direction, it may behave as a WDM demultiplexer.

Figure 1B:
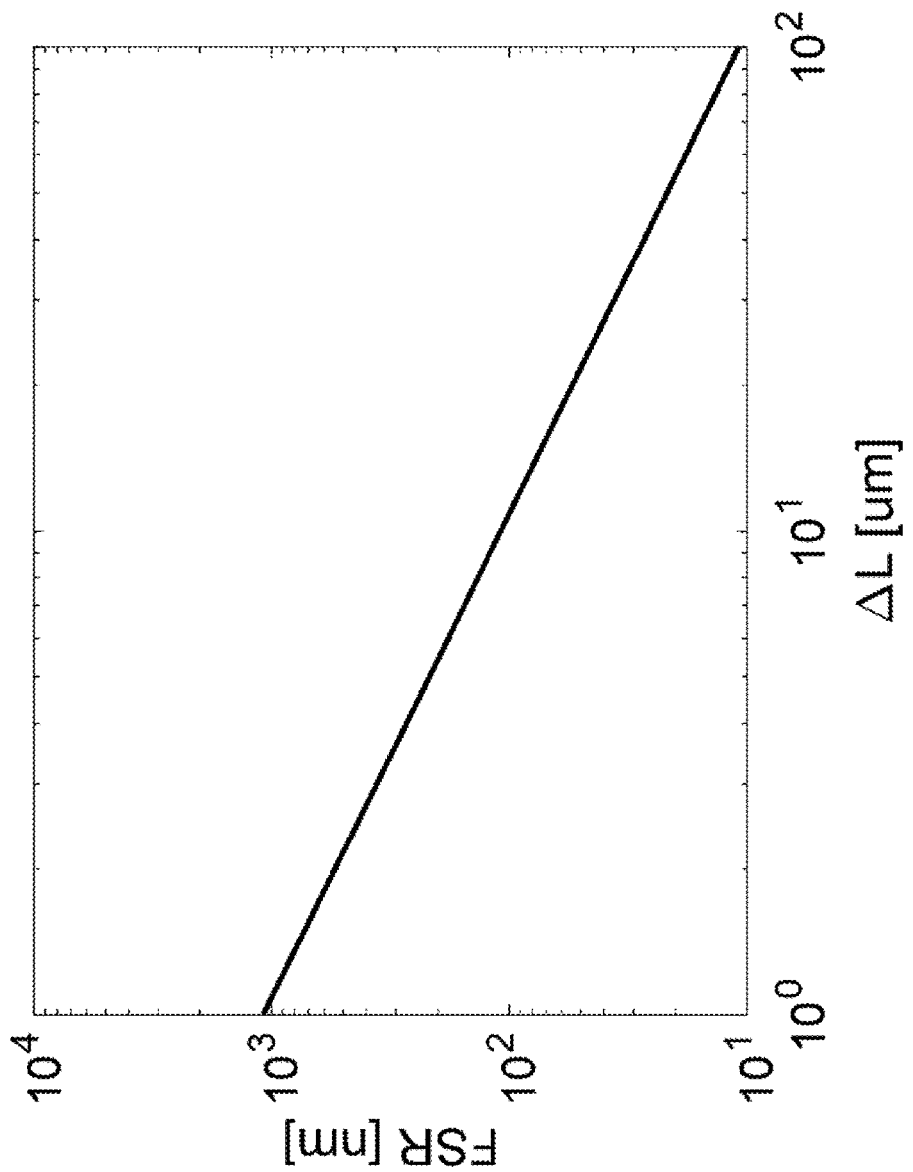
FIG. 1B is a graph of the free spectral range as a function of the incremental delay length, according to an embodiment of the present invention.
Figure 1C:
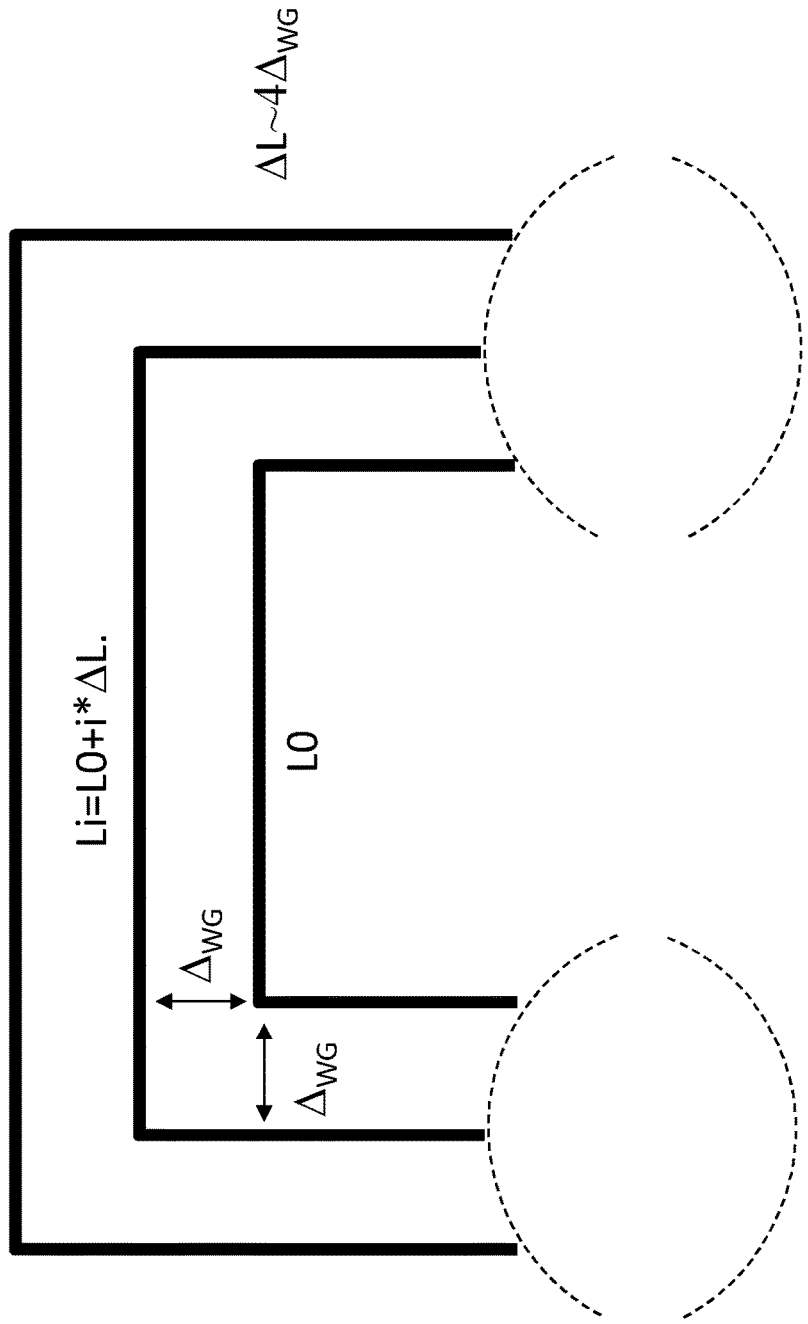
FIG. 1C is a schematic drawing of a rectangular arrayed waveguide grating, according to an embodiment of the present invention.

The free spectral range (FSR) of an AWG may be related to the incremental delay length (ΔL) of the waveguide array by the expression FSR=c/($n_g$ ΔL), where $n_g$ is the group index of the waveguide used in the waveguide array and depends on the fabrication platform, and c is the speed of light in vacuum. This expression is plotted in FIG. 1B in the case of a 3 um silicon on insulator (SOI) platform. The FSR of an AWG, on the other hand, may be larger or equal to the product $N_{Ch} \times Ch_{Spac}$, in order, for example, to have each channel within the range of interest univocally routed out of the corresponding output port of the AWG. A trade-off thus emerges between the product $N_{Ch} \times Ch_{Spac}$ and the incremental delay length (ΔL): a small incremental delay length (ΔL) may be used for an AWG with a large number of channels or a large channel spacing (or both). In the case of a rectangular AWG layout, the minimum incremental delay length (ΔL) may be constrained by the minimum transverse separation $\Delta_{WG}$ between the waveguides, which in turn may be constrained to prevent excessive mode overlap or physical overlapping of the waveguides (FIG. 1C). For this reason it may not be feasible to achieve more than 16 channels at a channel separation of 100 GHz, with a rectangular AWG layout fabricated on a 3 um SOI platform.

Figure 2B:
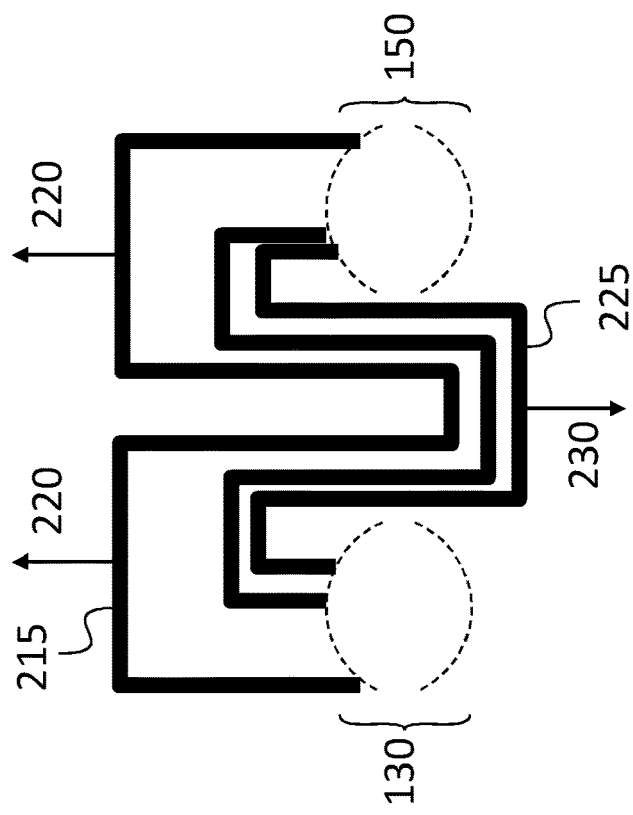
FIG. 2B is a schematic drawing of a T-shaped arrayed waveguide grating, according to an embodiment of the present invention.
Figure 2A:
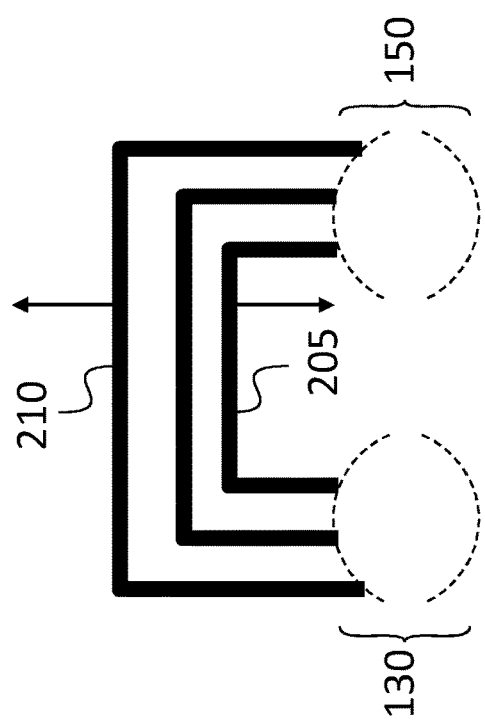
FIG. 2A is a schematic drawing of a rectangular arrayed waveguide grating, according to an embodiment of the present invention.

Referring to FIG. 2A, in a rectangular AWG design, the length difference between an innermost waveguide 205 of the array of waveguides and an outermost waveguide 210 of the array of waveguides may be adjusted by moving the respective horizontal portions up or down as shown by the arrows, but the minimum length difference that may be achieved is constrained if the waveguides 205, 210 are to avoid interfering with each other or with other waveguides that may exist between them.

By contrast, in the T-shaped array of waveguides of the AWG of FIG. 2B, the outermost waveguide 215 may be lengthened, without interfering with other waveguides of the array, by moving one or both of the upper horizontal portions upward (as shown by two upper arrows 220), and the innermost waveguide 225 may be lengthened, without interfering with other waveguides of the array, by moving the lower horizontal portion downward (as shown by the lower arrow 230). As such, the innermost waveguide 225 may be longer or shorter than the outermost waveguide 215, and the smallest length difference achievable is not affected by constraints on the minimum transverse separation between adjacent waveguides. Star couplers 130, 150 are shown schematically in FIGS. 2A and 2B. Moreover, the layout of the AWG of FIG. 2B facilitates the inclusion of a relatively large number waveguides in the array. The ability to include a relatively large number of waveguides may be advantageous in AWG designs in which the number of waveguides in the array is 3-6 times the greater of (i) the number of input channels and (ii) the number of output channels.

Figure 3:
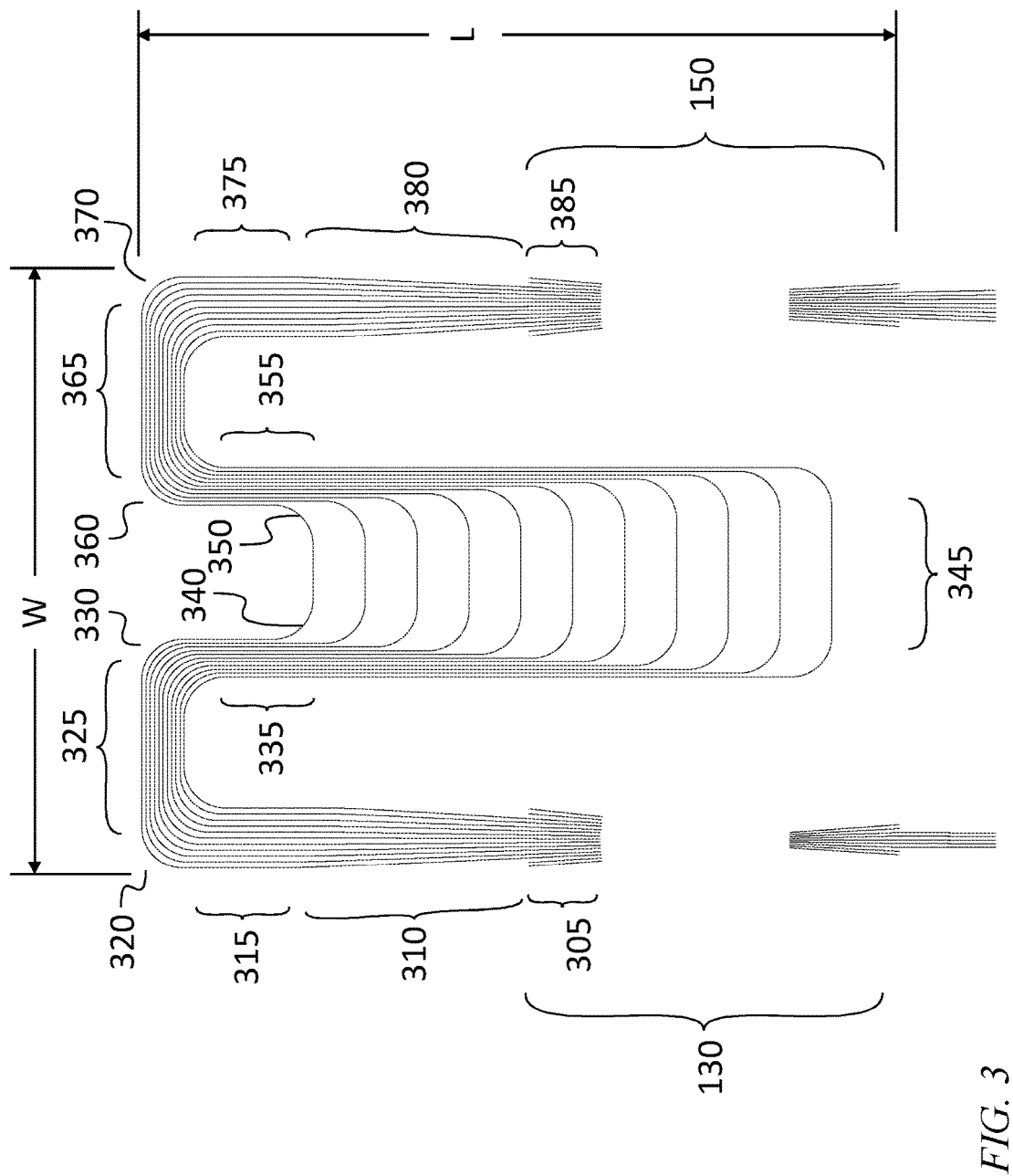
FIG. 3 is a plan view of a T-shaped arrayed waveguide grating, according to an embodiment of the present invention.

Referring to FIG. 3, in some embodiments each waveguide of the array may include, along the waveguide in a direction from the first star coupler to the second coupler, a first straight section 305 (inside an aperture of the first star coupler 130), a first curved section 310, a second straight section 315, a first clockwise bend 320, a third straight section 325, a second clockwise bend 330, a fourth straight section 335, a first counterclockwise bend 340, a fifth straight section 345, a second counterclockwise bend 350, a sixth straight section 355, a third clockwise bend 360, seventh straight section 365, a fourth clockwise bend 370, a eighth straight section 375, a second curved section 380, and a ninth straight section 385 (inside an aperture of the first star coupler 130).

As such, each waveguide of the array may include four clockwise bends and two counterclockwise bends, along the waveguide in a direction from the first star coupler to the second coupler, or, equivalently, each waveguide of the array may include four counterclockwise bends and two clockwise bends, along the waveguide in a direction from the second star coupler to the first coupler. In some embodiments some of the straight sections may be absent. For example, the third straight section 325 and the seventh straight section 365 may be absent for the innermost waveguide, and/or the fifth straight section 345 may be absent for the outermost waveguide.

A "bend" or a "curved section" as used herein, is a section of waveguide within which the curvature is in one direction, e.g., clockwise when progressing along the wavelength in one direction and counterclockwise when progressing along the wavelength in the opposite direction. Although in general a bend may be referred to as a curved section, and vice versa, the convention herein is to use the term "bend" to refer to sections of waveguide having a relatively short radius of curvature (e.g., less than 200 microns) and resulting in a significant change in direction (e.g., more than 60 degrees, and to use the term "curved section" to refer to sections of waveguide having a relatively long radius of curvature (e.g., between 0.5 mm and 20 mm) and resulting in a relatively small change in direction (e.g., less than 10 degrees).

Bends may be counted according to the total amount of direction change. For example, a sharply curved portion of the waveguide in which the direction changes by 180 degrees may be referred to as a single 180 degree bend, or, equivalently, as two 90 degree bends. Two sharply curved portions, separated by a straight section, may be referred to as two 90 degree bends if the direction change in each of them is 90 degrees, or they may be referred to as a single 180 degree bend. Each straight section may have a curvature of less than 0.01/mm. In some embodiments each bend of each waveguide is substantially identical to the corresponding bends of all of the other waveguides of the array, so that phase effects of the bends are common mode and the phase differences between the waveguides are due only to length differences. In some embodiments all of the clockwise bends have a first shape, and all of the counterclockwise bends have a second shape. In some embodiments each counterclockwise bend has a shape that is a mirror image of the shape of each of the clockwise bends.

The entire structure may be compact, having an overall length L, and an overall width W, as shown, and occupying an effective chip area of L×W. W may be between 1.5 mm and 14 mm, or, in some embodiments, between 3 mm and 7 mm, and L may be between 4 mm and 28 mm or, in some embodiments, between 8 mm and 14 mm. The effective chip area may be between 6 mm$^2$ and 35 mm$^2$. For example, in one embodiment, an arrayed waveguide grating with 24 channels and a channel spacing of 100 GHz has dimensions of 3 mm×8 mm. In another embodiment, an arrayed waveguide grating with 48 channels and a channel spacing of 100 GHz has dimensions of 7 mm×14 mm.

Figure 4A:
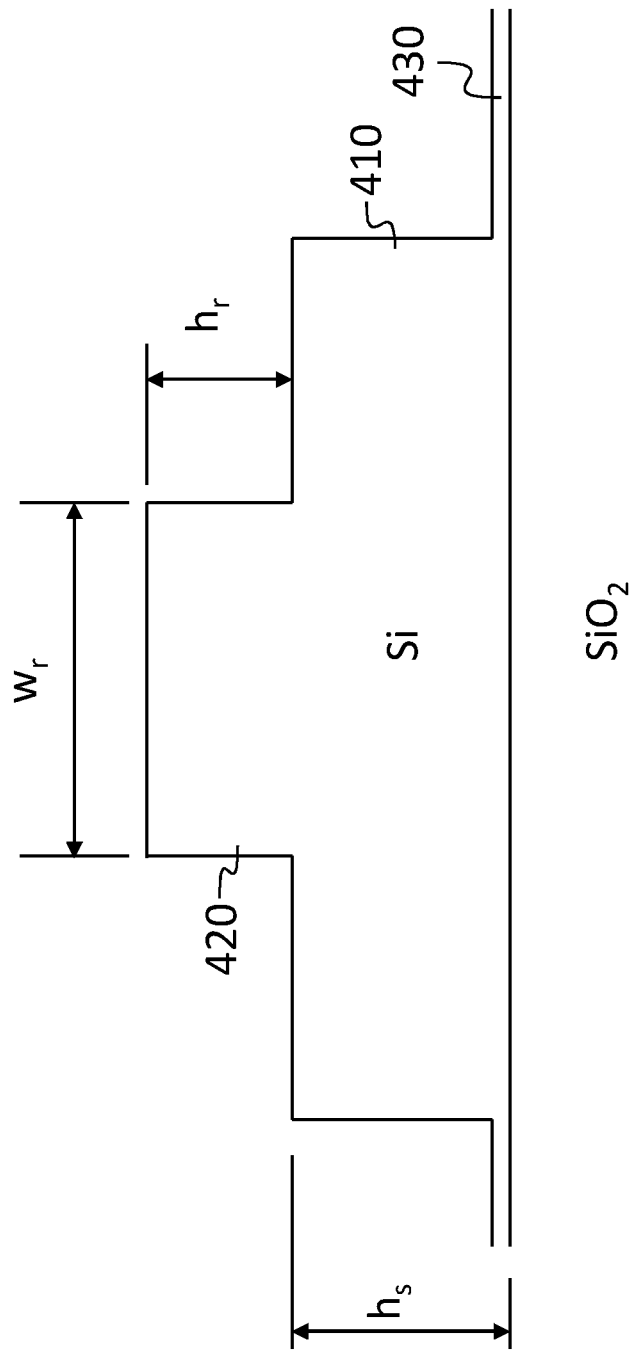
FIG. 4A is a cross section of a rib waveguide, according to an embodiment of the present invention.

In some embodiments, each of the waveguides of the waveguide array is a rib waveguide along one or more portions of its length. Referring to FIG. 4A, the waveguide may be fabricated as a silicon on insulator (SOI) structure, in which a layer of silicon (Si) 3 microns thick, on a layer of silicon dioxide ($SiO_2$) (which may be referred to as "buried oxide" or "BOX" layer) is etched to form a slab portion 410 and a rib portion 420 extending above the slab portion 410. In one embodiment, the width $w_r$ of the rib is 3.0 microns, the height $h_r$ of the rib is 1.2 microns, and the height $h_s$ of the slab is 1.8 microns. A thin (e.g., 0.2 micron thick) layer 430 of silicon may remain on the silicon dioxide in regions on both sides of the slab, for fabrication purposes; this layer may have a negligible effect on the optical characteristics of the waveguide. Adjacent waveguides in the waveguide array 120 may share a slab portion 410 (as shown in FIG. 4C).

Each waveguide may have a rib cross section in the curved sections 310, 380. The curved rib waveguide may shed higher order modes (i.e., confine them sufficiently poorly that their attenuation within these portions is great, e.g., more than 1000 dB/cm), and as a result any light coupled into the bends 320, 370 adjacent to the curved sections 310, 380 may be substantially entirely in the fundamental modes.

Figure 4B:
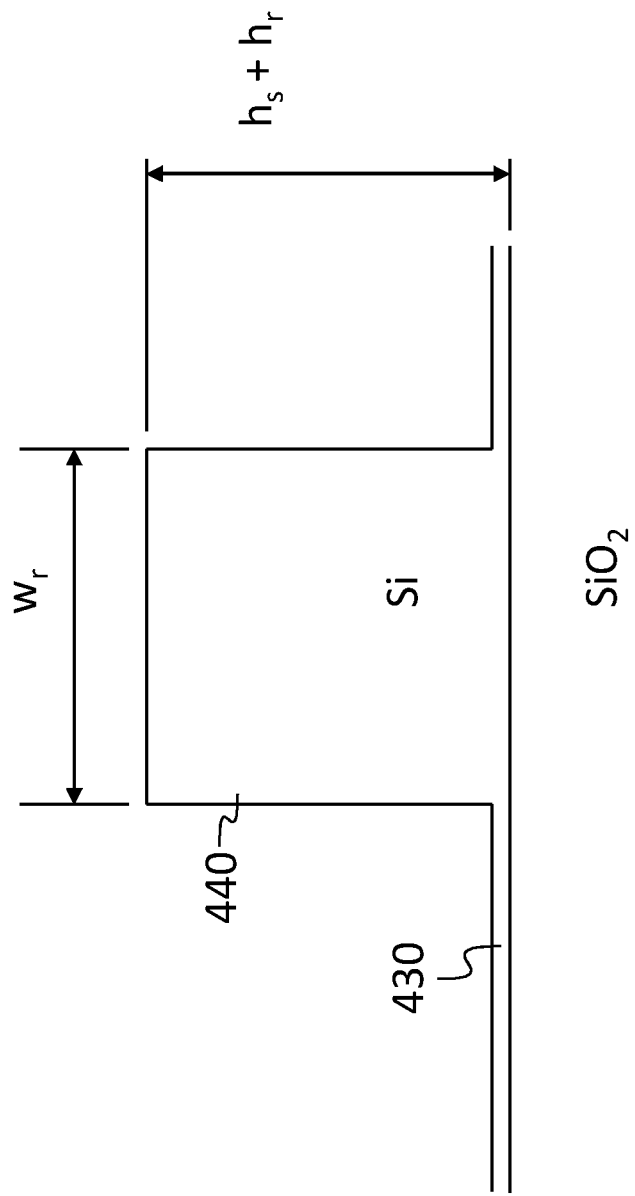
FIG. 4B is a cross section of a strip waveguide, according to an embodiment of the present invention.
Figure 4C:
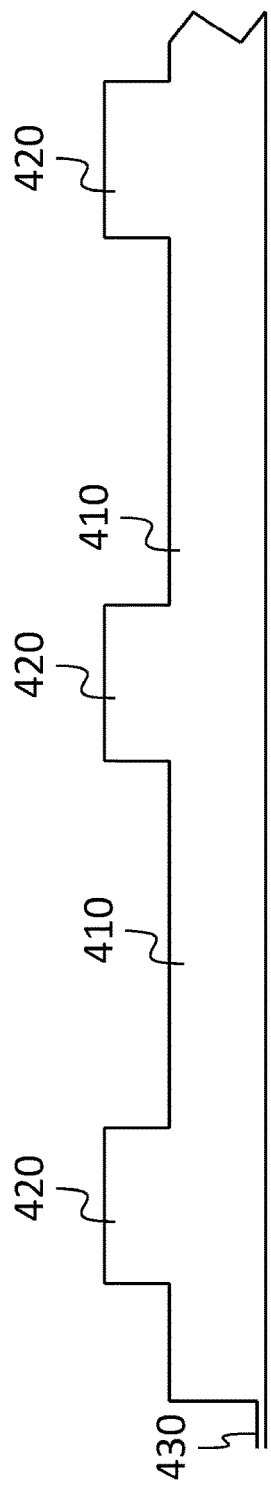
FIG. 4C is a cross section of a portion of an array of rib waveguides on a shared slab, according to an embodiment of the present invention.

Within the bends, and within the straight sections 325, 335, 345, 355, 365, the waveguides may be strip waveguides, as illustrated in FIG. 4B, including a strip 440 and lacking a slab portion. The strip may have a height equal to the combined height of slab portion 410 and rib portion 420, i.e., a height of $h_s+h_r$. The strip waveguides may be suitable for forming tight (<200 micron, or even tighter) bend radii without unacceptable optical loss and with minimal coupling from the fundamental modes into higher order modes. They may also be multi-mode waveguides.

Tapering, i.e., gradual changes in the cross section along the length of the waveguide, may be used to transition between rib and strip waveguides, and to transition to wide rib cross sections that may provide improved coupling to the free space regions of the star couplers 130, 150. Each transitions between rib waveguides strip waveguides may be referred to as a "rib to strip converter", having a "rib end" connected to a rib waveguide, and a "strip end" connected to a strip waveguide. Each rib to strip converter may include a region in which the slab portion 410 of each of the rib waveguides tapers to become progressively narrower until it is the same width as the corresponding rib portion 420 and is no longer distinct from the rib portion 420. To the extent that higher order modes are suppressed by the curved portions 310, 380, and that the rib to strip converters do not couple light into higher order modes, the light coupled into the strip waveguides of the bends may be entirely in the fundamental modes.

Figure 4D:
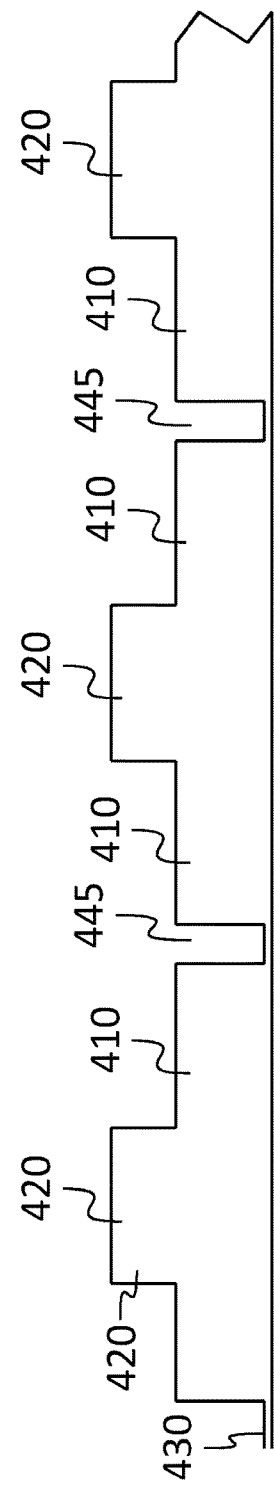
FIG. 4D is a portion of a cross section of a rib to strip converter, according to an embodiment of the present invention.

FIG. 4C shows a cross section of a portion of the waveguide array on the rib end of a rib to strip converter. In the embodiment of FIG. 4C, the rib waveguides share a slab portion 410. FIG. 4D shows a cross section of a portion of the waveguide array at a point within the rib to strip converter. A trench 445 that extends nearly to the bottom of the slab portion, half-way between each pair of adjacent ribs, begins at the rib end of the rib to strip converter and then widens in the direction of the strip end of the rib to strip converter.

Each waveguide of the waveguide array may have a curvature that is adiabatic along the length of the waveguide, i.e., a rate of change of curvature that does not exceed a set value, e.g., a value in a range from 1/mm$^2$ to 20/mm$^2$, e.g., 5/mm$^2$, 10/mm$^2$, or 15/mm$^2$. As used herein, the "curvature" of the waveguide is the reciprocal of the radius of curvature. For example, portions (such as the curved sections 310, 380, and the bends 320, 330, 340, 350, 360, 370) of each waveguide of the waveguide array may have the shape of a portion of an Euler spiral, which follows a curve for which the rate of change of curvature with distance along the curve is constant. For example, a curved portion of a waveguide of the waveguide array may have the shape of an Euler arc, which consists of two symmetric portions of an Euler spiral. As used herein, an "Euler arc" (or "Euler bend") is symmetric about its midpoint, has a curvature that is greatest at its midpoint and vanishes at each of the two ends of the Euler arc, and that changes at a constant rate in each half of the Euler arc, the rate of change of curvature being equal in magnitude, and opposite in sign, in the two halves of the Euler arc. The term "Euler curve" is used herein to refer to any portion, of an Euler spiral, that has a vanishing curvature at one end.

The absence of discontinuities in the curvature of the waveguide may prevent coupling into higher order modes that otherwise may occur at such a discontinuity. Moreover, as mentioned above, a curved section of rib waveguide (as, e.g., the curved sections 310, 380) may act as a mode filter, effectively confining only the fundamental (TE0 and TM0) modes.

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide, and on the coupling between fundamental modes and leaky higher order modes. Accordingly, the curvature of a waveguide (as distinct from the local curvature of a wall of the waveguide) is defined herein as the curvature of that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light.

Although a 5×8 arrayed waveguide grating is illustrated in FIG. 3, having 5 waveguides at the external end of the first star coupler 130 and 8 waveguides at the external end of the second star coupler second, other embodiments may be fabricated in an analogous manner to be M×N arrayed waveguide gratings, having M first waveguides and N second waveguides, with M and N having integer values that may differ from 5 and 8 respectively, and may be as small as 1. Similarly, further embodiments may be fabricated to be cyclic N×N arrayed waveguide gratings or non-cyclic N×N arrayed waveguide gratings. Embodiments of the invention may be fabricated in any high index contrast system suitable for forming tight 90 degree bends, e.g., silicon on insulator (SOI), indium phosphide (InP), or silicon nitride/silicon dioxide ($SiN/SiO_2$).

Figure 5:
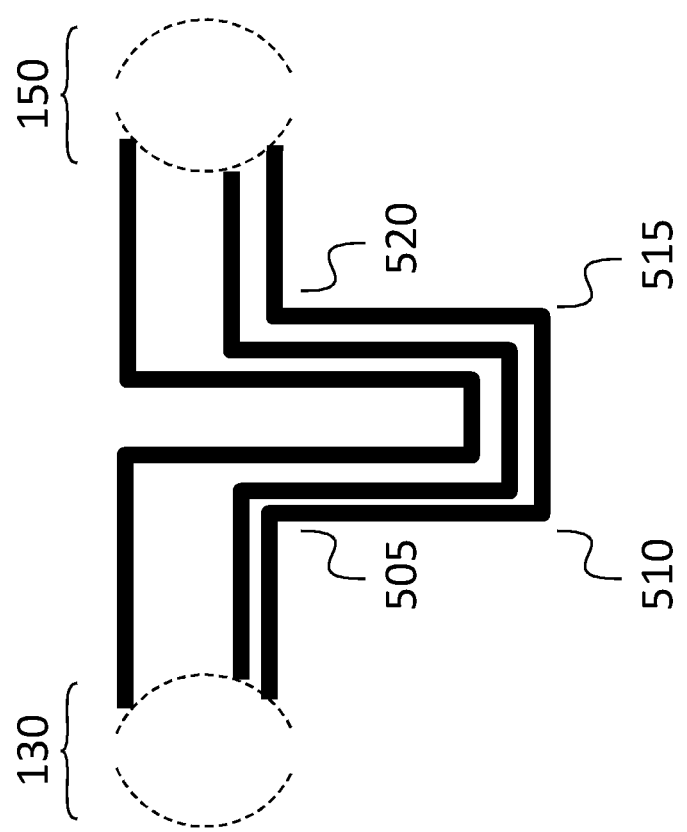
FIG. 5 is a schematic drawing of a T-shaped arrayed waveguide grating, according to an embodiment of the present invention.
Figure 6A:
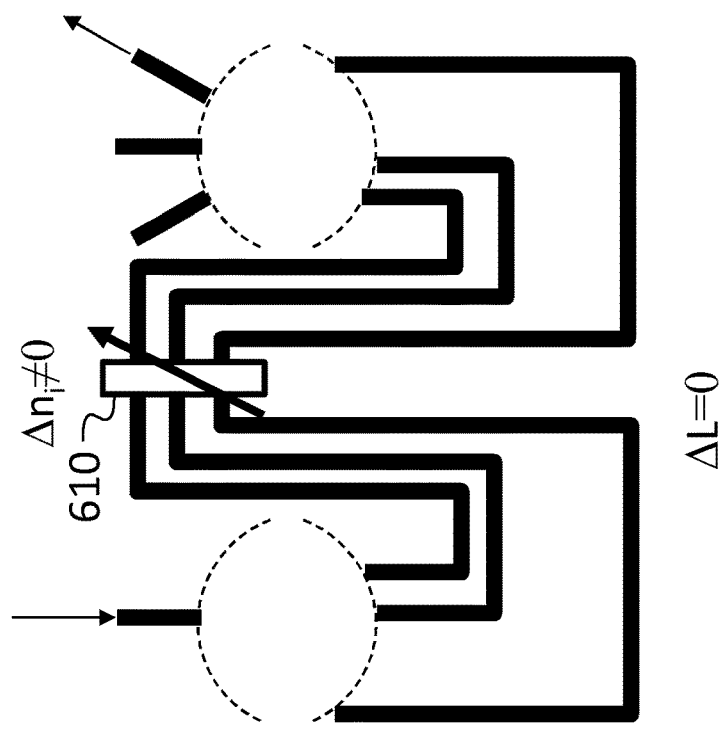
FIG. 6A is a schematic drawing of a tunable T-shaped arrayed waveguide grating, according to an embodiment of the present invention.
Figure 6B:
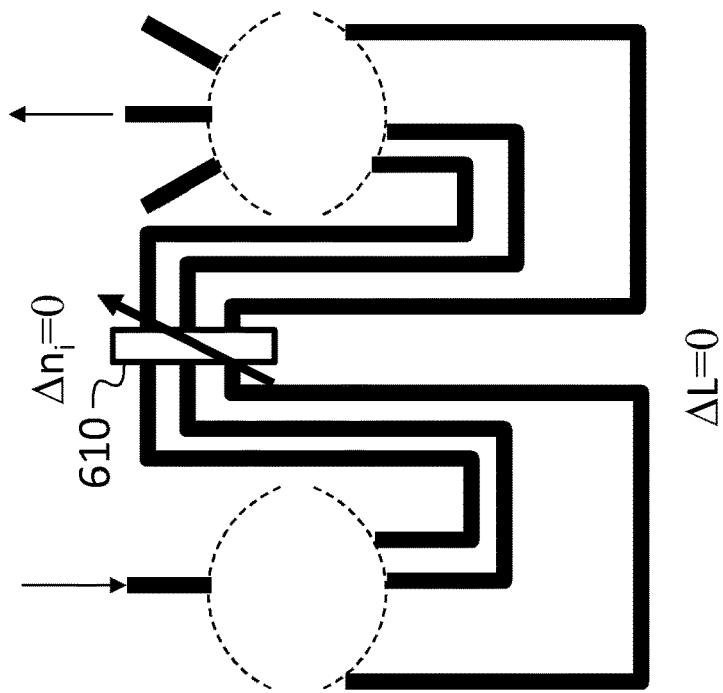
FIG. 6B is a schematic drawing of a tunable T-shaped arrayed waveguide grating, according to an embodiment of the present invention.

FIG. 5 shows a schematic view of a T-shaped arrayed waveguide grating that lacks the two outermost bends (e.g., that lacks the first and fourth clockwise bends 320, 370) of the embodiment of FIG. 3, but is otherwise analogous. FIGS. 6A and 6B show a tunable T-shaped arrayed waveguide grating including a tuning section 610. In the tuning section 610, each waveguide of a subset of the waveguides (the subset either including all of the waveguides, or being a proper subset, and including, e.g., all but one of the waveguides) includes a waveguide section within which the effective index of refraction may be adjusted, e.g., using temperature tuning (using an individual heater on each waveguide or a global heater with gradient heat profile) or using a phase modulator in each waveguide of the subset. In this manner, if the lengths of the waveguides are all the same, then when the tuning section 610 is adjusted so that all of the waveguide sections have the same effective index of refraction (so that the effective lengths are also all the same, i.e., the effective length difference is zero for any pair of waveguides), monochromatic light fed into the central input will exit from the central output (as shown in FIG. 6A).

If the tuning section 610 is adjusted so that the waveguide sections do not all have the same effective index of refraction (e.g., so that there is a difference in effective length, that is the same between any pair of adjacent waveguides), then monochromatic light fed into the central input may exit from another output (as shown in FIG. 6B). A tunable T-shaped arrayed waveguide grating such as that of FIGS. 6A and 6B may also be used as an arrayed waveguide grating with a tunable, and arbitrary large, free spectral range.

Although exemplary embodiments of a T-shaped arrayed waveguide grating have been specifically described and illustrated herein, many modifications and variations will be apparent to those skilled in the art. Accordingly, it is to be understood that a T-shaped arrayed waveguide grating constructed according to principles of this invention may be embodied other than as specifically described herein. The invention is also defined in the following claims, and equivalents thereof.

What is claimed is:

1. An arrayed waveguide grating, comprising:
a first star coupler;
a second star coupler; and
an array of waveguides connecting the first star coupler and the second star coupler,
each of the waveguides having four bends, each of the bends having a change of direction of at least 80 degrees,
wherein a first waveguide of the array of waveguides has, along the first waveguide in a direction from the first star coupler to the second star coupler:
a first clockwise bend;
a second clockwise bend following the first clockwise bend;
a first counterclockwise bend following the second clockwise bend;
a second counterclockwise bend following the first counterclockwise bend;
a third clockwise bend following the second counterclockwise bend; and
a fourth clockwise bend following the third clockwise bend, and
wherein:
all of the waveguides of the array of waveguides have the same physical length, and
each of a subset of the waveguides includes a section with a respective adjustable effective index of refraction,
the arrayed waveguide grating being tunable, by adjustment of the respective effective indices of refraction, to have, for any pair of the waveguides of the array of waveguides, an effective length difference of zero.

2. An arrayed waveguide grating, comprising:
a first star coupler;
a second star coupler; and
an array of waveguides connecting the first star coupler and the second star coupler,
each of the waveguides having four bends, each of the bends having a change of direction of at least 80 degrees,
wherein a first waveguide of the array of waveguides extends continuously from the first star coupler to the second star coupler and has, along the first waveguide in a direction from the first star coupler to the second star coupler:
a first clockwise bend;
a second clockwise bend following the first clockwise bend;

a first counterclockwise bend following the second clockwise bend;

a second counterclockwise bend following the first counterclockwise bend;

a third clockwise bend following the second counterclockwise bend; and a fourth clockwise bend following the third clockwise bend, and wherein:

all of the waveguides of the array of waveguides have the same physical length, and each of a subset of the waveguides includes a section with a respective adjustable effective index of refraction, the arrayed waveguide grating being tunable, by adjustment of the respective effective indices of refraction, to have, for any pair of the waveguides of the array of waveguides, an effective length difference of zero.

3. The arrayed waveguide grating of claim 1, wherein each of the bends has a minimum radius of curvature of less than 200 microns.

4. The arrayed waveguide grating of claim 1, wherein the arrayed waveguide grating has 18 channels and a minimum channel spacing of the arrayed waveguide grating is at least 80 GHz.

5. The arrayed waveguide grating of claim 4, wherein the array of waveguides comprises 12 waveguides including the first waveguide.

6. The arrayed waveguide grating of claim 5, wherein each of the bends has a minimum radius of curvature of less than 200 microns.

7. The arrayed waveguide grating of claim 5, wherein the arrayed waveguide grating has 18 channels at the second star coupler and a minimum channel spacing of the arrayed waveguide grating is at least 80 GHz.

8. The arrayed waveguide grating of claim 7, wherein the array of waveguides comprises 12 waveguides including the first waveguide.

9. The arrayed waveguide grating of claim 1, wherein the first waveguide further has, along the waveguide in a direction from the first star coupler to the second star coupler:

a first curved section preceding the first clockwise bend, the first curved section having:

a minimum radius of curvature less than 3 mm and greater than 1 mm, and a change of direction of less than 10 degrees.

10. The arrayed waveguide grating of claim 1, wherein, along the entire length of the first waveguide, the rate of change of curvature is less than $15/mm^2$.

11. The arrayed waveguide grating of claim 1, wherein the first waveguide further has:

a first straight section between the first clockwise bend and the second clockwise bend, the first straight section having a maximum curvature less than 0.01/mm; and a second straight section between the third clockwise bend and the fourth clockwise bend, the second straight section having a maximum curvature less than 0.01/mm.

12. The arrayed waveguide grating of claim 1, wherein the first waveguide further has a first straight section between the first counterclockwise bend and the second counterclockwise bend, the first straight section having a maximum curvature less than 0.01/mm.

13. The arrayed waveguide grating of claim 1, wherein the arrayed waveguide grating has an overall length and an overall width, the product of the overall length and an overall width being less than 40 $mm^2$.

14. The arrayed waveguide grating of claim 13, wherein the arrayed waveguide grating has a minimum channel separation of at least 80 GHz.

15. The arrayed waveguide grating of claim 14, wherein the arrayed waveguide grating has at least 18 channels.

16. The arrayed waveguide grating of claim 2, wherein the first waveguide further has, along the waveguide in a direction from the first star coupler to the second star coupler:

a first curved section preceding the first clockwise bend, the first curved section having:

a minimum radius of curvature less than 3 mm and greater than 1 mm, and a change of direction of less than 10 degrees.

17. The arrayed waveguide grating of claim 2, wherein, along the entire length of the first waveguide, the rate of change of curvature is less than $15/mm^2$.

18. The arrayed waveguide grating of claim 2, wherein the first waveguide further has:

a first straight section between the first clockwise bend and the second clockwise bend, the first straight section having a maximum curvature less than 0.01/mm; and a second straight section between the third clockwise bend and the fourth clockwise bend, the second straight section having a maximum curvature less than 0.01/mm.

19. The arrayed waveguide grating of claim 2, wherein the first waveguide further has a first straight section between the first counterclockwise bend and the second counterclockwise bend, the first straight section having a maximum curvature less than 0.01/mm.

20. The arrayed waveguide grating of claim 2, wherein the arrayed waveguide grating has an overall length and an overall width, the product of the overall length and an overall width being less than 40 $mm^2$.

* * * * *